Aug. 23, 1938.　　　L. E. LA BRIE　　　2,127,740
BRAKE
Filed Dec. 19, 1935　　　4 Sheets-Sheet 1

INVENTOR.
LUDGER E. LABRIE
BY
ATTORNEY.

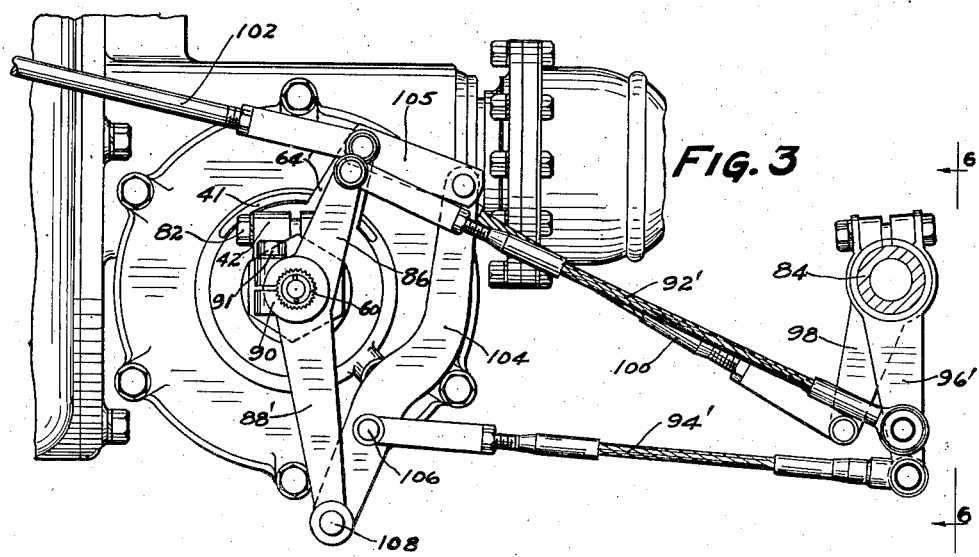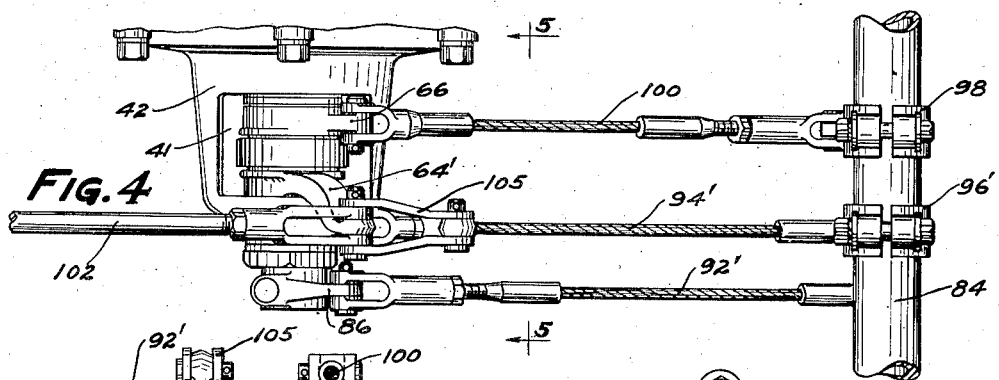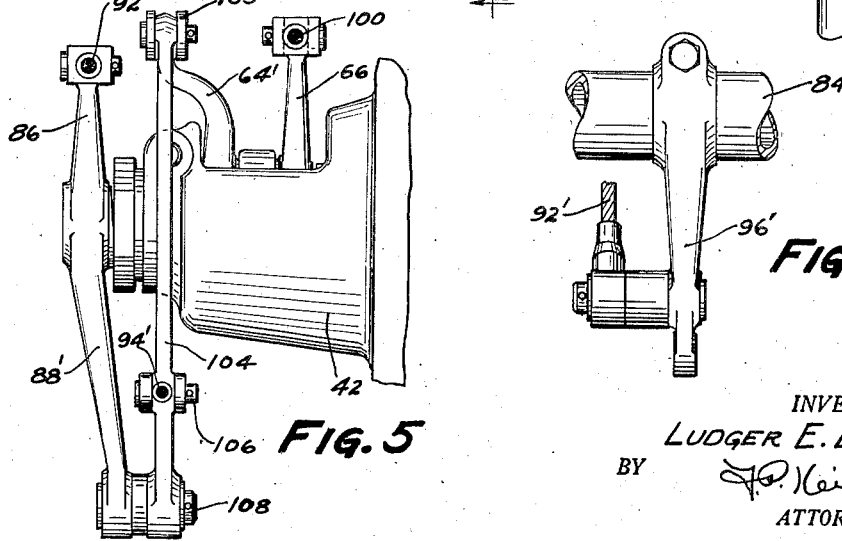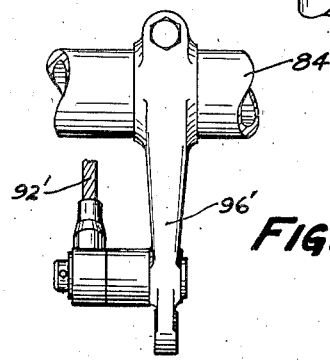

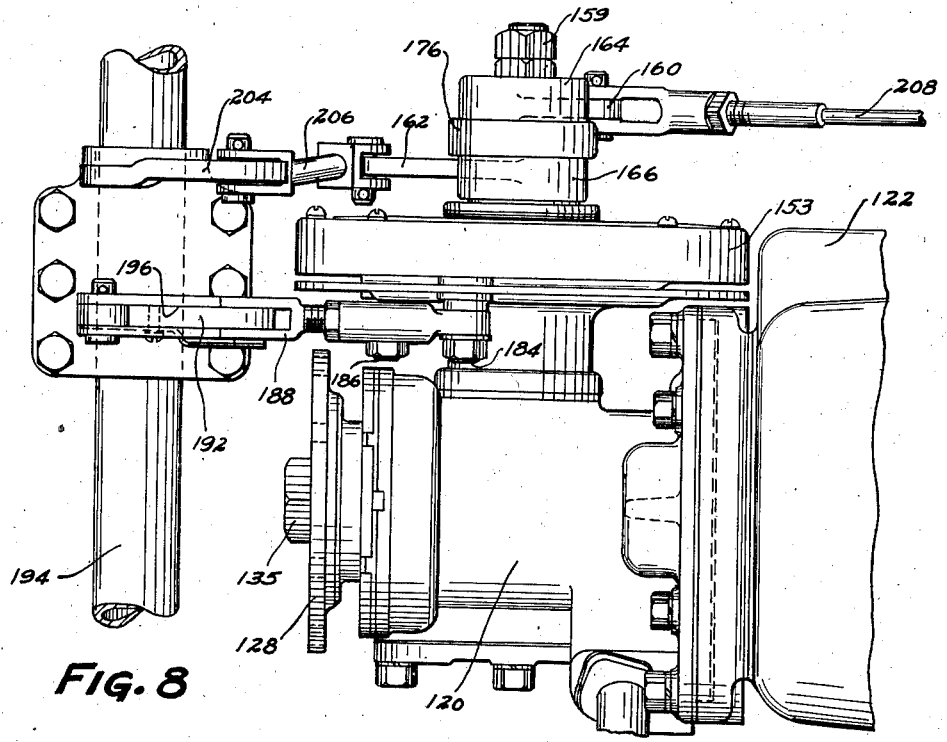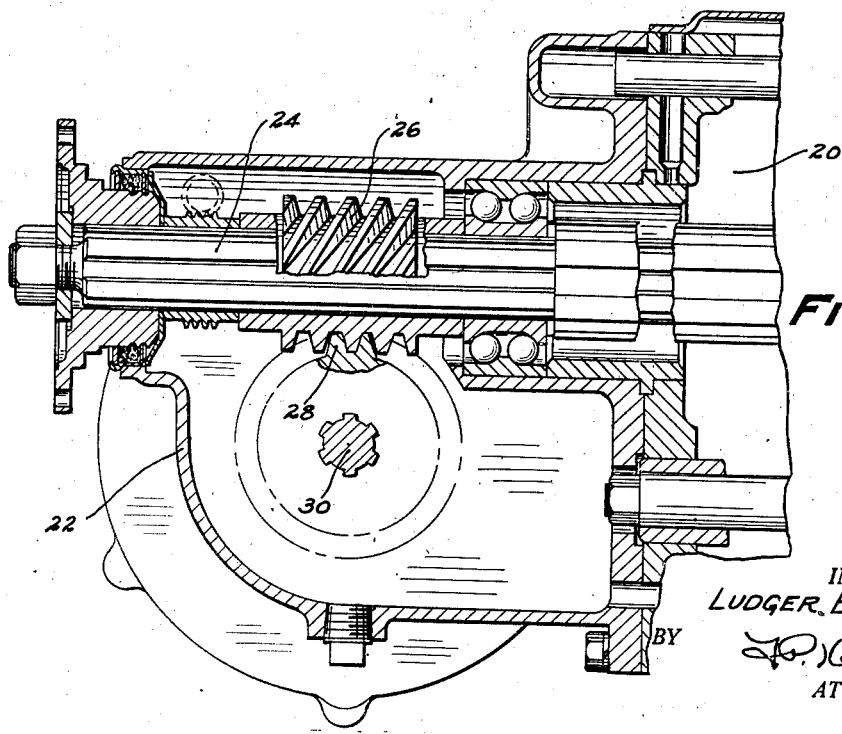

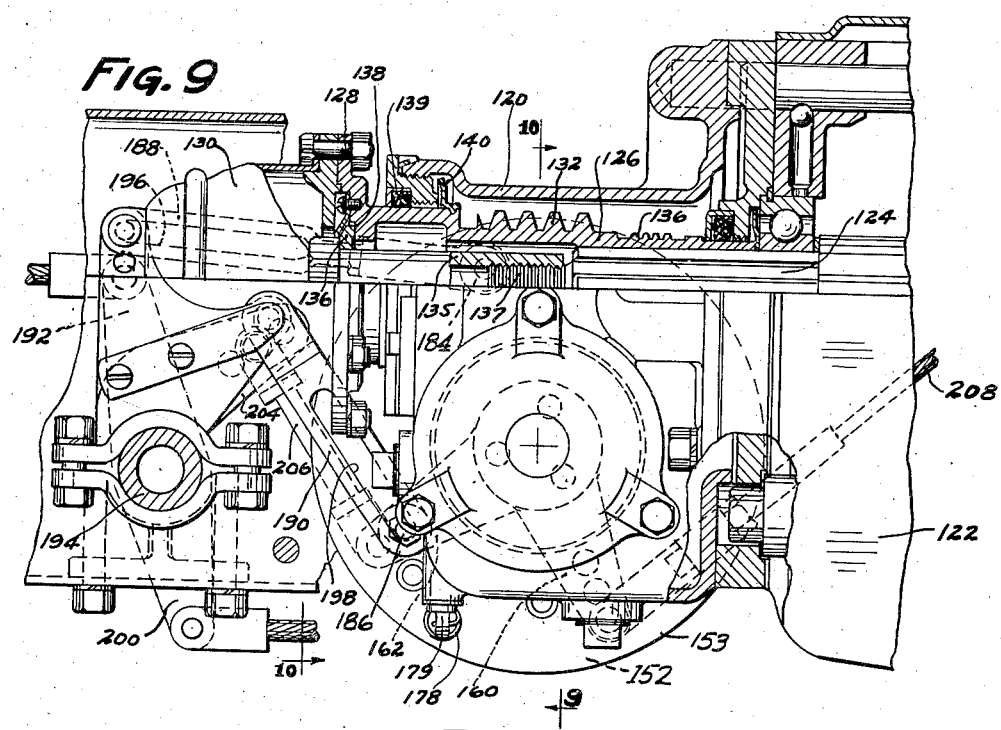
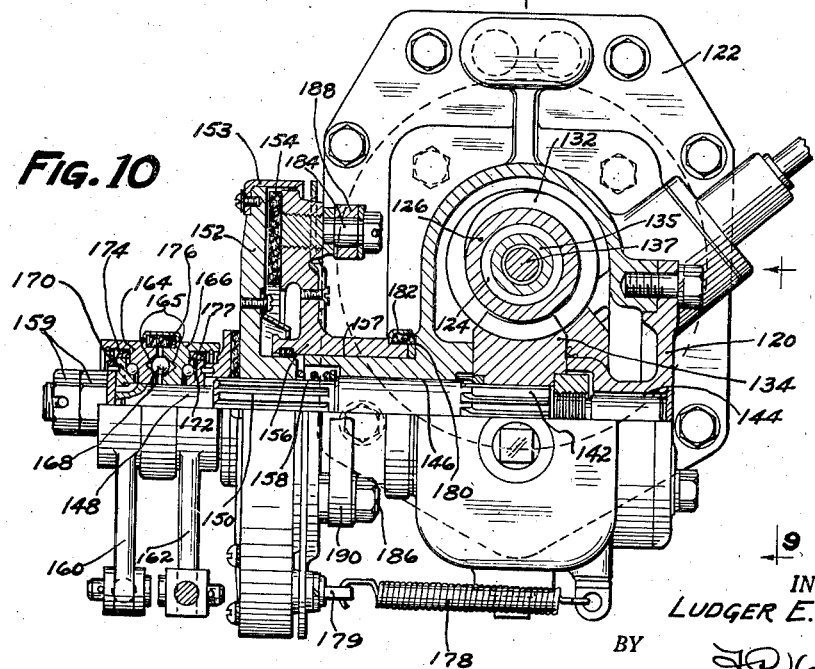

Patented Aug. 23, 1938

2,127,740

UNITED STATES PATENT OFFICE 2,127,740

BRAKE

Ludger E. La Brie, Detroit, Mich., assignor to Bendix Products Corporation, South Bend, Ind., a corporation of Indiana Application December 19, 1935, Serial No. 55,218

13 Claims. (Cl. 188—140)

This invention relates to motor vehicle power brakes and more particularly to those known as mechanical servo brakes, wherein the power obtained for brake operation is derived from torque taken from a controllable friction device associated with a direct connection with the propeller shaft of a vehicle or its equivalent, the friction device being so arranged that brake engagement is readily regulated by controlling the extent of frictional contact between a continuously rotating element and an element whose rotation is adapted to operate the brakes. A distinguishing feature of the present invention is an arrangement whereby the degree of braking force and the degree of movement of the braking linkage affects the operation of the friction controlling member, so that the operator is enabled to feel the extent of braking action, the operation of the controlling member being generally proportional to the power effort transmitted to the brakes.

Accordingly, it is an object of this invention to provide a new and improved mechanical servo brake employing a friction brake operating torque device together with novel actuating means for the friction device.

Another object of the invention is to provide a new and improved mechanical servo brake of the friction type wherein the actuating means requires a force in proportion to the brake operating power developed by the mechanical servo.

A further object of the invention is to provide a new and improved mechanical servo brake of the friction type wherein the actuating means requires a movement in proportion to the movement of the brake operating linkage operated by the mechanical servo.

Still another object of the invention is to provide a new and improved mechanical servo brake of the friction type wherein the actuating means therefor requires a movement in proportion to the movement of the brake operating linkage operated by the mechanical servo and requires an actuating force in proportion to the brake operating power developed by the mechanical servo.

Other objects of the invention have to do with the constructions and modifications employed to obtain the results incident to the foregoing objects and to provide structures of simplicity, ruggedness, reliability and efficient operation.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein like reference numerals indicate like parts:

Fig. 3 is an end view of the mechanical servo of Fig. 1 supplied with a modified linkage for the transmission of power to the brake operating cross-shaft;

Fig. 4 is a top view of the linkage of Fig. 3;

Fig. 5 is a side view of the mechanical servo taken on a plane passing through the line 5—5 of Fig. 4;

Fig. 6 is an end view of a detail of a portion of the cross-shaft as viewed from a plane indicated at 6—6 in Fig. 3;

Fig. 7 is a sectional view of the mechanical servo of Figs. 1 and 2 taken on the line 7—7 of Fig. 1;

Fig. 8 is a top view of a modified form of mechanical servo with a different brake operating cross-shaft linkage;

Fig. 9 is an end elevation of the mechanical servo of Fig. 8, portions being cut away, particularly as on the line 9—9 of Fig. 10, and Fig. 10 is a side elevation of the same, a portion thereof being shown in section as indicated by the section line 10—10 of Fig. 9.

Figure 1:
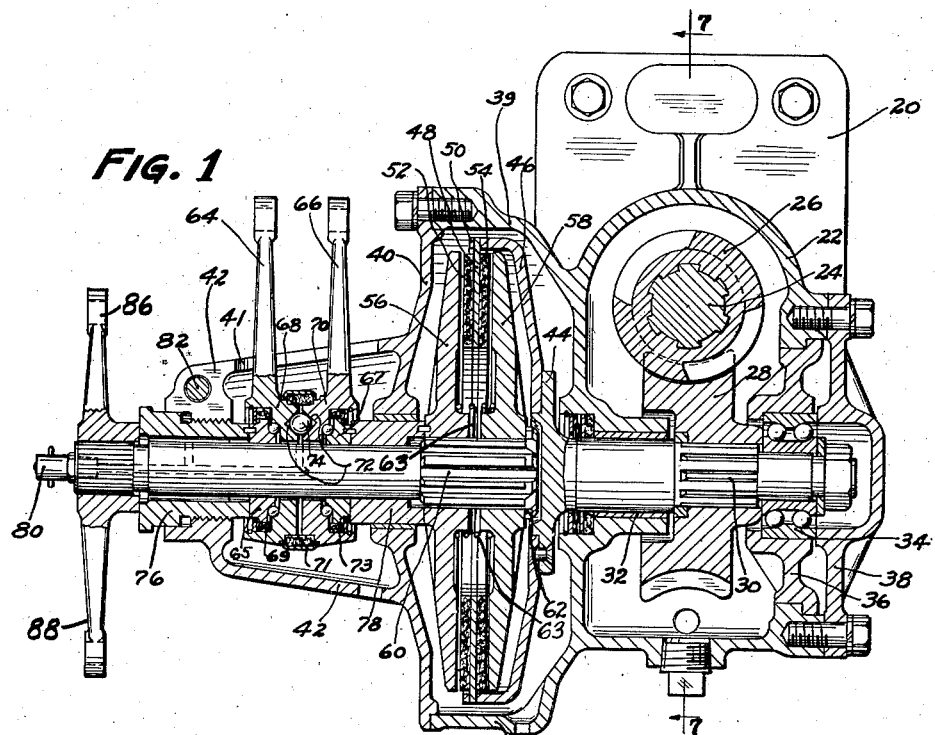
Fig. 1 is a longitudinal section taken through the friction and actuating mechanism of a mechanical servo.
Figure 2:
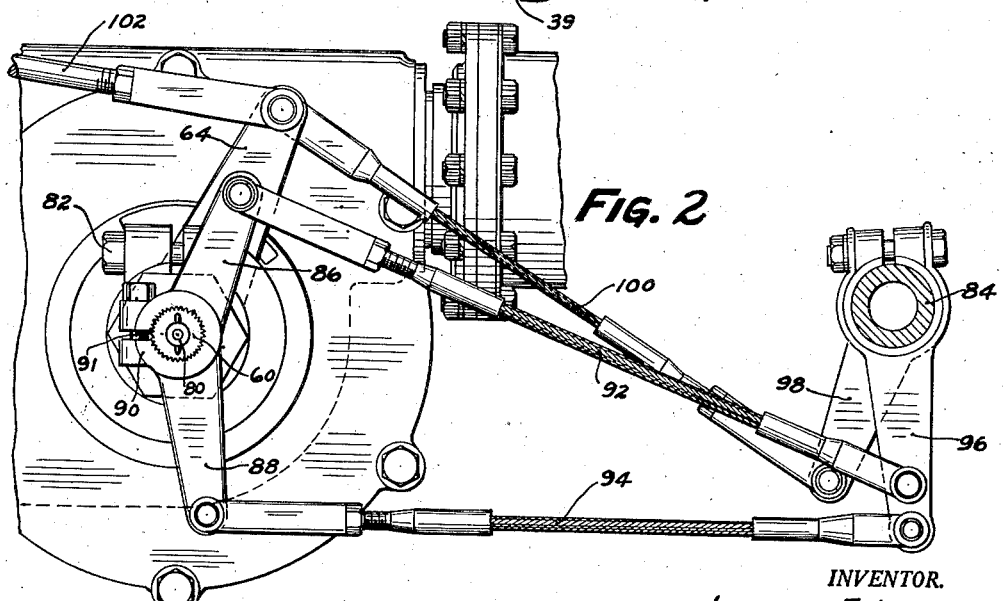
Fig. 2 is an end view of the servo of Fig. 1 illustrating the linkage and connections to a vehicle brake operating cross-shaft.

Referring to the drawings and more particularly to Figs. 1, 2 and 7, there is shown a transmission or gear box 20 having mounted on the back end thereof a casing 22 enclosing a shaft extension 24, the latter being provided with a spiral gear 26 meshing with a second spiral gear 28 mounted on an axis at right angles thereto and therebelow. The spiral gear 28 is splined to a shaft 30 carried in and extending through a plain bearing 32 in one side of the casing 22 and in a double thrust anti-friction bearing 34 rigidly held in place between the bearing support plate 36 and a side cover plate 38.

The casing 22 is provided with a cylindrical outwardly facing cup or shell 39 on the plain bearing side thereof to which is secured a cover plate 40 integral with stub shaft bearing support 42. The shaft 30 extending through the plain bearing 32 in the side of the casing 22 is provided with a flange 44 to which is secured a cup-shaped spider 46, the latter substantially filling the outwardly facing cup or shell 39 and carrying an annular rotatable friction disc 48, the same being splined to the spider 46 by interengaging slots and teeth 50.

The annular friction disc with friction linings 52 and 54 is adapted to be engaged by relatively stationary although slightly rotatable friction plates 56 and 58 located on either side of friction disc 48 and supported from and splined on a stub shaft 60 rotatably carried in the stub shaft bearing support 42, the stub shaft being aligned with the shaft 30. The stub shaft 60 is provided with a shoulder 62 on its end adapted to limit the axial movement of one of the plates 56 and 58, and a helical compression spring 63 is located around the shaft 60 between the plates to normally separate the plates from engagement with the friction disc 48.

Located on the shaft 60 and between the bearing support 42 and the friction plates 56 and 58 are a pair of rock levers 64 and 66, each of which has a hub portion 68 and 70 having conical recesses 72 in the adjacent faces thereof which contain thrust balls 74. Relative rotation of the levers thus produces an axial spreading action which reacts upon a threaded adjustment sleeve 76 and forces the friction plate 56 towards the friction plate 58 thereby frictionally engaging the annular friction disc 48. The lever 64 reacts through a thrust bearing 65 which may be, if desired, keyed to the sleeve 76 and which also contains a grease retaining washer 69. The lever 66 likewise acts through a thrust bearing 67 which may, if desired, be keyed to a thrust sleeve 78 and the plate 56. Grease retaining washers 71 and 73 are also provided, the washers 69, 71 and 73 being necessary in view of the open slot 41 in the casing 42 through the levers extend and the provision for greasing from a grease fitting 80, rather than the lubricant in the transmission. The position of the sleeve 76 may be varied at will for adjustment purposes and locked in place by the clamping bolt 82 acting on the split end of the casing 42.

In Fig. 2, there is shown a wheel brake operating cross-shaft 84 from which the vehicle brakes may be operated. The shaft 60 which is splined to the friction plates 56 and 58 is provided at its exposed end with a lever having oppositely extending arms 86 and 88 and a split hub 90 with a clamp bolt 91. The lever arms are connected by flexible cables 92 and 94 to a lever 96 fixed to the cross-shaft 84, so that rotation of the shaft 60 in either direction will tension one cable and buckle the other to always rock the cross-shaft in one direction only. The lever arm 86 is shown as slightly shorter than arm 88, thus permitting the attachment of cable 92 on lever 96 at a point short of the end.

It will be understood that one of the operating levers 64 or 66 could be fixed and the other actuated to apply the brake, but to provide a measure of "feel" in the actuation of the brake, one of the levers, for example 66, is connected to a second lever 98 on the cross-shaft 84 by a cable 100, and thus as the cross-shaft rocks, the lever 66 is permitted to follow the movement of lever 64 which is suitably connected to a hand lever or pedal through cable 102, so that the extent of movement of the cross-shaft can always be felt by the extent of movement of the actuating lever 64 due to the follow-up action of lever 66.

In Figs. 3 to 6 inclusive, a slightly modified form of linkage connecting the power servo with the cross-shaft is illustrated wherein the "feel" transmitted to the actuating lever or pedal through link 102 is a combination of the rotation of the cross-shaft and the torque applied thereto. For this purpose, the lever arm 88' is not directly connected to the cross-shaft lever 96' but is connected to a floating lever 104 at one end thereof, the other end of which is connected through a link 105 to the actuating lever 64', which is offset as shown to bring it somewhat in line with lever arm 88'. The cable 94' is then connected to the floating lever at any suitable point such as 106, it being understood that the point may be varied in its distance from the connection 108 between the floating lever and the arm 88' depending upon the extent of the desired torque reaction desired on the actuating cable 102, the greater the distance, the greater the reaction. It will also be understood that the torque reaction of this particular modification applies only for brake actuation wherein the cable 94' is under tension and thus operates for one direction of rotation of the shaft 60, although a similar arrangement may be inserted in the link 92' to make the apparatus torque responsive for either direction of rotation.

In Figs. 8, 9 and 10 a modified form of the present invention is illustrated, the same however comprising a transmission power take-off having a casing 120 secured to the rear of the usual transmission casing 122. The transmission drive shaft 124 which extends into the power take-off casing 120 is provided with an extension sleeve 126 splined thereon which emerges with a universal joint flange 128 from the rear of the housing 120. The usual universal joint 130 connecting the transmission to the propeller shaft is secured to the flange 128, and the sleeve is held on the drive shaft 124 by an extension nut 135 and washer 136 engaging an internal shoulder 138 in the sleeve and threaded concentrically on the end 137 of the drive shaft 124.

The sleeve is provided with a worm 132 for driving a worm wheel 134, and also a speedometer worm 136. A packing 139 and oil slinger 140 are associated with the sleeve where it emerges from the casing 120 to prevent the loss of lubricant.

The worm wheel 134 is splined and fixed in position on a shaft 142 having bearings 144 and 146 in the housing 120, the shaft extending outside the housing as at 148 and being provided with a spline 150 for slidably carrying a friction disc 152. Adjacent the friction disc 152 is a relatively stationary friction plate 154 mounted on a sleeve 156 rotatably supported on a cylindrical bearing 157 surrounding the shaft bearing 146 and concentric therewith. The friction disc 152 is adapted to slide on the spline 150 and a spring 158 on the shaft 142 urges the disc 152 to the left or away from the plate 154. On the extreme end of the shaft 142 are a pair of nuts 159 forming a reaction shoulder against which the thrust or actuating levers 160 and 162 may bear when operating to move the disc 152 to the right and into frictional contact with the plate 154. As in the modification of Fig. 1, the levers 160 and 162 have collar parts 164 and 166 with facing conical recesses 165 in which are placed balls 168, so that relative rotation of the levers 160 and 162 causes a spreading action. As before thrust bearings 170 and 172 are provided together with suitable packing 174, 176 and 177 so as to totally enclose the bearings and protect them from the elements. Likewise the friction disc 152 is provided with a dust guard 153 so that the exposed parts may be protected. A stiff spring 178 tensioned between the casing and an eye 179 secured to the plate 154 maintains its supporting sleeve 156 against a shoulder 180 at the end of the cylindrical bearing 157. A felt dust guard 182 is likewise provided at the shoulder 180 to prevent entrance of dirt.

To deliver the torque transmitted to the friction disc 154, the same is provided with a pair of studs 184 and 186 forming crank pins and a pair of links 188 and 190 which extend therefrom to a sector or bell crank lever 192 fixed to a wheel brake operating cross-shaft 194. The link 188 connected to the pin 184 located above center is provided with a pin and slot connection 196 to the bell crank 192 so that clockwise rotation of the friction plate 154 will cause clockwise rotation of the sector. The link 190 is connected to the sector or bell crank lever 192 and to the pin 186 through an overrunning slot 198, the pin 186 being below the center of the plate 154, counter clockwise rotation thereof will produce clockwise rotation of the cross-shaft. It will also appear obvious that active transmission through one of the links 188 or 190 causes the other to overrun by reason of the slots therein.

The cross-shaft is provided with one or more levers such as 200 which may be connected to the wheel brakes. In order that the extent of operation of the brakes may be "felt" at the foot pedal, the cross-shaft may be provided with another lever 204 which is connected by a link 206 to the lever 162, so that follow-up lever 162 tends to follow the movement of operating lever 160 connected to the usual foot pedal by a cable 208.

The operation of either modification should be readily understood from the foregoing description, and may be briefly stated as follows. The main transmission drive shaft is such that it always must rotate so long as the car is in motion and the drive wheels rotating, and hence the power take-off cross-shaft geared direct thereto will always rotate when braking is desired. By rotating the operating lever relative to the follow-up lever causes engagement of the friction disc and plate to a more or less degree depending on the will of the operator, thereby setting up a torque in the friction plate tending to cause rotation thereof. Through the suitable linkage set forth, this torque is transmitted to the wheel brakes. The amount of movement and in Figs. 3, 4, 5 and 6 the amount of effort transmitted to the wheel brakes is transmitted to the operating lever so that movement and braking force will always give a proportional feel or movement in the control lever and its operating foot pedal.

There has thus been described two embodiments of a mechanical servo power brake unit readily adapted for installation on the usual automotive vehicle without necessitating redesign or reorganization of the parts, it being merely necessary to substitute certain parts and apply a housing to the rear of the transmission. Where the universal joint is moved rearwardly to accommodate this apparatus, the propeller shaft is usually built of telescoping splined sections, which may usually be conveniently telescoped to provide the extra room required.

Although two embodiments of the invention has been illustrated and described, it is to be understood that the invention is not to be limited thereto but may be embodied in other mechanical arrangements and forms. For example, the various features of any one of the modifications might be substituted for those of the other modifications. As such and other changes in construction and arrangement may be made without departing from the spirit of the invention as will be apparent to those skilled in the art, reference will be had to the appended claims for a definition of the limits of the invention.

What is claimed is:

1. In a mechanical servo power brake, a friction disc driven from an automotive vehicle drive shaft and rotatable therewith, a friction plate engageable with said friction disc, means for transmitting torque from said plate to wheel brakes including a coaxial shaft having levers at one end and said plate at the other, a pair of relatively rotatable control levers coaxially arranged with respect to said disc, plate and shaft and between said first named levers and plate, and means for causing relative axial movement between said control levers on relative rotation thereof to engage said disc and plate, means for operating one of the control levers, and means for permitting the other control lever to move in direct proportion to the rotation of said plate.

2. In a mechanical servo power brake, a friction disc driven from an automotive vehicle drive shaft and rotatable therewith, a friction plate engageable with said friction disc, means for transmitting torque from said plate to wheel brakes, a pair of relatively rotatable levers coaxially arranged with respect to said disc and plate, and means for causing relative axial movement between said levers on relative rotation thereof to engage said disc and plate, and means interposed in said transmitting means and associated with means for operating one of the levers to impose on said operating means a reactive force proportional to the force transmitted by said torque transmitting means.

3. In a mechanical servo power brake, a friction disc driven from an automotive vehicle drive shaft and rotatable therewith, a friction plate engageable with said friction disc, means for transmitting torque from said plate to wheel brakes, a pair of relatively rotatable levers coaxially arranged with respect to said disc and plate, and means for causing relative axial movement between said levers on relative rotation thereof to engage said disc and plate, means interposed in said transmitting means and associated with means for operating one of the levers to impose on said operating means a reactive force proportional to the force transmitted by said torque transmitting means, and means for moving the other lever in direct proportion to the movement of said transmitting means.

4. In a mechanical servo power brake, a brake operating cross-shaft, a shaft rotatable in either direction and adapted to have varying degrees of torque applied thereto, oppositely extending levers on said torque shaft and connections therefrom to a lever on said cross-shaft, means for controlling the degree of torque in said torque shaft, and means connected to a lever on the cross shaft for producing a movement in said controlling means proportional to the movement of the cross-shaft.

5. In a mechanical servo power brake, a brake operating cross-shaft, a shaft rotatable in either direction and adapted to have varying degrees of torque applied thereto, oppositely extending levers on said torque shaft, a controlling lever for controlling the degree of torque in said torque shaft, a connection from one of said oppositely extending levers to a cross-shaft lever, a second connection from the other oppositely extending lever through a floating lever to the cross-shaft lever, and a connection from the floating lever to said controlling lever.

6. In a mechanical servo power brake, a brake operating cross-shaft, a shaft rotatable in either direction and adapted to have varying degrees of torque applied thereto, oppositely extending levers on said torque shaft, a pair of relatively rotatable levers, relative rotation between which controls the degree of torque in said torque shaft, overrunning connections from said oppositely extending levers to a cross-shaft lever and a connection from a lever on the cross-shaft to one of said relatively rotative levers.

7. In a mechanical servo power brake, a brake operating cross-shaft, a shaft rotatable in either direction and adapted to have varying degrees of torque applied thereto, oppositely extending levers on said torque shaft, a pair of relatively rotatable levers, relative rotation between which controls the degree of torque in said torque shaft, overrunning connections from said oppositely extending levers to a cross-shaft lever, a connection from a lever on the cross-shaft to one of said relatively rotative levers, and means for operating the other lever.

8. In a mechanical servo power brake, a brake operating cross-shaft, a shaft rotatable in either direction and adapted to have varying degrees of torque applied thereto, oppositely extending levers on said torque shaft, a pair of relatively rotatable levers, relative rotation between which controls the degree of torque in said torque shaft, connections between said oppositely extending levers and a brake cross-shaft lever, one of said connections having a floating lever interposed therein, said lever being connected to one of said pair of relatively rotatable levers, and a connection from the other of said pair of levers to a lever on said cross-shaft.

9. In a mechanical servo power brake, a brake operating cross-shaft, a shaft rotatable in either direction and adapted to have varying degrees of torque applied thereto, oppositely extending levers on said torque shaft, a pair of relatively rotatable levers, relative rotation between which controls the degree of torque in said torque shaft, connections between said oppositely extending levers and a brake cross-shaft lever, one of said connections having a floating lever interposed therein, said lever being connected to one of said pair of relatively rotatable levers, and means for operating the one of said pair of levers connected to the floating lever.

10. In a mechanical servo power brake, a torque shaft having a slidable friction plate splined thereon, a stationary housing for said torque shaft forming a support therefor, a sleeve around said shaft threaded in said housing and forming an adjustable thrust abutment, and an axial thrust producing means adapted to bear against said sleeve and move said friction plate.

11. In a mechanical servo power brake, a vehicle driven power shaft having a friction disc splined thereon, means for moving the friction disc axially into engagement with a relatively stationary rocking torque plate, a pair of crank pins on said plate disposed at an obtuse angle from each other, a brake operating cross shaft closely adjacent said plate and having a lever with pivots thereon, and links with overrunning slots connecting said lever pivots with each of said pins, said links extending in a tangential direction from their respective pivots and pins.

12. In a mechanical servo power brake, a wheel brake operating means, a rotational source of power, means for deriving a torque from said source of power and for actuating said wheel brake operating means, control means for controlling the amount of torque derived from said source and means associated with said control means and said operating means for assuring a movement of said control means directly proportional to the movement of said operating means, and means independent of said torque deriving means for assuring a constant ratio between the force applied to the control means and the force transmitted from the source of power to the operating means.

13. In a mechanical servo power brake, a wheel brake operating means, a rotational source of power, means for deriving a torque from said source of power and for actuating said wheel brake operating means, control means for controlling the amount of torque derived from said source and means independent of said torque deriving means and associated with said control means and said operating means for assuring a constant ratio between the force applied to the controlling means and the force transmitted from the source of power to the operating means.

LUDGER E. LA BRIE.